United States Patent
Park et al.

(10) Patent No.: US 8,184,510 B2
(45) Date of Patent: *May 22, 2012

(54) METHOD OF RECORDING AND REPRODUCING AN OPTICAL RECORDING MEDIUM

(75) Inventors: Sang On Park, Kyonggi-do (KR); Seong Pyo Hong, Seoul (KR)

(73) Assignee: Ionosep X Holdings L.L.C., Wilmington, DE (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/123,102

(22) Filed: May 6, 2005

(65) Prior Publication Data

US 2005/0195707 A1    Sep. 8, 2005

Related U.S. Application Data

(63) Continuation of application No. 09/572,855, filed on May 18, 2000, now Pat. No. 6,963,520.

(30) Foreign Application Priority Data

May 18, 1999  (KR) .................................. 1999-17870
May 25, 1999  (KR) .................................. 1999-18895
May 25, 1999  (KR) .................................. 1999-18899

(51) Int. Cl.
   *G11B 7/00*    (2006.01)
(52) U.S. Cl. ............... 369/44.32; 369/53.19; 369/53.28
(58) Field of Classification Search ............... 369/44.11, 369/44.32, 53.14, 53.19, 53.28, 44.29, 44.35–44.36
See application file for complete search history.

(56) References Cited

U.S. PATENT DOCUMENTS

| 4,654,838 | A | * | 3/1987 | Sugiki ........................ 369/44.42 |
| 5,077,719 | A | * | 12/1991 | Yanagi et al. ............... 369/44.13 |
| 5,253,239 | A | * | 10/1993 | Edahiro et al. ............. 369/44.28 |
| 5,510,938 | A | * | 4/1996 | Sakakibara et al. ........ 360/77.14 |
| 5,523,989 | A | * | 6/1996 | Ishibashi ................... 369/44.32 |

(Continued)

FOREIGN PATENT DOCUMENTS

JP          61-242346 A    10/1986

(Continued)

OTHER PUBLICATIONS

JP OA dated May 7, 2010, for Japanese Patent Application No. 2003-428378, 8 pages.

(Continued)

*Primary Examiner* — Wayne Young
*Assistant Examiner* — Dionne Pendleton
(74) *Attorney, Agent, or Firm* — Turocy & Watson, LLP

(57) ABSTRACT

There is provided a method of recording and reproducing an optical recording medium which performs a tracking servo and a focusing servo by irradiating a laser beam onto determined positions including lands and grooves of a track of the recording medium and detecting a tracking error signal and a focusing error signal using an electric signal from an optical pickup for picking up the laser beam reflected from the recording medium. The method includes the steps of: detecting servo information in a plurality of the determined positions including lands and grooves of the track while rotating the recording medium in a state in which only the focus servo is turned on when the optical recording medium is loaded, storing the servo information of the respective determined positions as a table, and performing the servo of the corresponding positions by applying the servo information in table during an actual data recording/reproduction.

19 Claims, 11 Drawing Sheets

U.S. PATENT DOCUMENTS

| | | | |
|---|---|---|---|
| 5,590,103 A * | 12/1996 | Noda | 369/44.29 |
| 5,703,855 A * | 12/1997 | Kirino et al. | 369/53.19 |
| 5,808,989 A * | 9/1998 | Ueki et al. | 369/47.11 |
| 5,854,780 A | 12/1998 | Opheij et al. | |
| 5,910,936 A * | 6/1999 | Marino | 369/53.19 |
| 5,970,032 A * | 10/1999 | Ikeda et al. | 369/44.29 |
| 6,011,762 A * | 1/2000 | Watanabe et al. | 369/44.27 |
| 6,018,507 A * | 1/2000 | Takeda et al. | 369/111 |
| 6,128,258 A | 10/2000 | Kimura et al. | |
| 6,282,161 B1 | 8/2001 | Son et al. | |
| 6,363,039 B2 | 3/2002 | Hayashi et al. | |
| 6,407,968 B1 | 6/2002 | Nakata et al. | |
| 6,414,921 B1 | 7/2002 | Kim | |
| 6,459,664 B1 * | 10/2002 | Yamada et al. | 369/44.32 |
| 6,522,606 B1 * | 2/2003 | Tanaka et al. | 369/44.36 |
| 6,549,493 B1 * | 4/2003 | Nakamura et al. | 369/44.32 |
| 6,963,520 B1 * | 11/2005 | Park et al. | 369/44.11 |

FOREIGN PATENT DOCUMENTS

| | | | |
|---|---|---|---|
| JP | 62-033346 A | | 2/1987 |
| JP | 63-133324 A | | 6/1988 |
| JP | 08-287486 | | 1/1996 |
| JP | 8-287486 A | | 11/1996 |
| JP | 09016984 A | * | 1/1997 |
| JP | 09-180209 | | 11/1997 |
| JP | 10-177729 A | | 6/1998 |
| JP | 10-312565 A | | 11/1998 |
| JP | 11-007638 A | | 1/1999 |

OTHER PUBLICATIONS

Japanese OA for Japanese Patent Application No. 2003-428378, mailing date Mar. 8, 2011, 3 pages.

Japanese OA for Japanese Patent Application No. 2003-428378, mailing date Jun. 21, 2011, 2 pages.

* cited by examiner

Maximum $TE_{vpp}$

LPF output (mean of TE)

tilt=0, focus offset=6.35, track offset=5.0 tilt=−1, focus offset=6.35, track offset=5.0

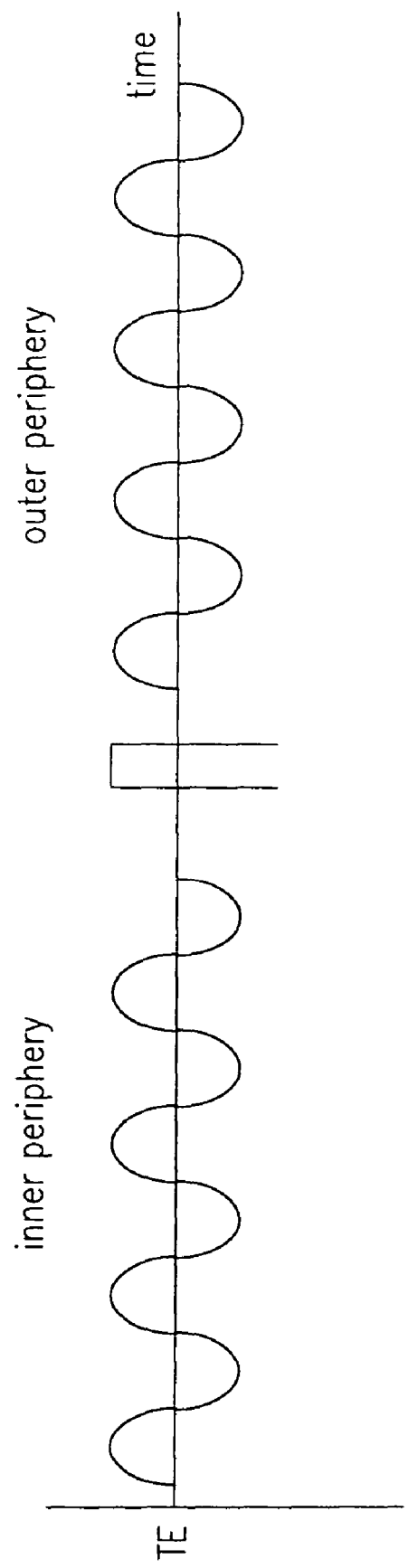

METHOD OF RECORDING AND REPRODUCING AN OPTICAL RECORDING MEDIUM

This application is a Continuation of application Ser. No. 09/572,855, filed on May 18, 2000, now U.S. Pat. No. 6,963,520, which issued on Nov. 8, 2005, and for which priority is claimed under 35 U.S.C. §120; and this application claims priority of Korean Patent Application Nos. P1999-17870, P1999-18895, and P1999-18899 filed on May 18, 1999, May 25, 1999, and May 25, 1999, respectively, under 35 U.S.C. §119, which are now Korean Patent Nos. 10-06622640000, 10-06172050000, and 10-06622630000, which were granted on Dec. 21, 2006, Aug. 22, 2006 and Dec. 21, 2006, respectively. The entire contents of each of these applications, and granted patents, are hereby incorporated by reference.

BACKGROUND OF THE INVENTION

1. Field of the Invention

The present invention relates to an optical recording medium, and more particularly to a method of detecting and compensating for defocus and tilt of the optical recording medium.

2. Description of the Related Art

Generally, an optical recording medium is classified into three types, that is, a read only memory (ROM) type, a WORM type that is writable once only, and a rewritable type that is repeatedly writable.

Examples of the repeatedly rewritable optical recording medium are on optical disc, a rewritable compact disc (CD-RW) and a rewritable digital versatile disc (DVD-RW, DVD-RAM, and DVD+RW).

A rewritable optical disc such as the DVD-RAM has signal tracks composed of lands and grooves, and tracking control can be performed even in a blank disc on which no information signal is recorded. In order to heighten the recording density, the information signal is recorded on the lands and the grooves, respectively.

In manufacturing the optical disc, warp may occur during a resin-injection and hardening process, and eccentricity may occur despite the center hole in the disc. Eccentricity may also occur due to the deviation of the center hole though the tracks are accurately written on the disc with a pitch of a predetermined standard and in a spiral shape. Accordingly, the disc rotates eccentrically, and thus the center axis of a driving motor may not completely coincide with the center of the track.

Since this makes it difficult to accurately read the signal recorded on a desired track, a standard for the CD and DVD is determined with respect to the amount of deviation, and a tracking servo is performed so that an optical beam constantly follows the desired track even if eccentricity occurs.

The tracking servo produces an electric signal corresponding to a beam trace state, and corrects the position of the beam by moving an object lens or an optical pickup body in a radial direction according to the electric signal, so that the track is accurately followed.

Meanwhile, deviation of the beam from the corresponding track occurs due to the inclination of the disc, as well as the eccentricity of the disc. This disc inclination may occur due to a mechanical problem such as a placement error when the disc is placed on a spindle motor. At this time, focusing does not perpendicularly accord with tracking, but is distorted. The inclined state of the disc is called a tilt.

Such a tilt matters little in case of a CD having a wide track pitch and thus having a big tilt margin. Here, the tilt margin refers to the amount of inclination that can be compensated for. However, the DVD, which is a high-density optical application device, has a narrow track pitch, and thus has a small radial tilt margin for a zitter. Accordingly, if only a small tilt occurs, i.e., if the disc is inclined only slightly, a detrack causing the beam to go over to a neighboring track occurs, and this cannot be sufficiently corrected by the tracking servo alone. In other words, if the beam is located on the center of the track even though the beam goes over to the neighboring track, the tracking servo may judge that the track is accurately followed.

In this case, data cannot be accurately read out from the disc during reproduction. Also, data cannot be accurately written on the corresponding track during recording, and this causes dual distortion to occur in the reproduced data.

According to a method for solving the above-described tilt, a dedicated tilt sensor for detecting the tilt, for instance, a light-receiving element for tilt detection is provided in the pickup, and detects the tilt of the disc. This method, however, has a drawback in that an increase in the size of the set results in a loss of efficiency.

Meanwhile, in order to record information or reproduce the recorded information, the optical recording/reproducing apparatus performs focus control through the optical pickup.

During focus control, i.e., focus servo, if an optical focus deviates from the disc surface (hereinafter referred to as defocus), the quality of the recorded or reproduced data deteriorates, and this causes the operation of the system to become unstable.

Accordingly, the focus servo is performed in a manner such that the optical pickup moves up and down by driving a focus actuator in the optical pickup to follow upward and downward movement of the rotating optical disc. Specifically, the focus actuator keeps the distance between the object lens and the optical disc constant by driving the object lens up and down, for example, in the direction of the focus axis, according to a focus error signal.

Meanwhile, in the optical disc such as the DVD-RAM, whereby data can be recorded on both the lands and the grooves, the focus offsets are different due to the depth difference between the land and the groove, and thus defocus may occur even if the focus error signal is zero.

Specifically, since the offset has not been adjusted due to the depth difference between the land and the groove even if focusing is performed, focusing may not be effected when it is applied to the track of the groove as it is. Also, even in the event that focusing is performed on the track of the groove, defocusing may occur on the track of the land due to the depth difference between the land and the groove.

At this time, the defocus state cannot be identified only by the focus error signal, and this causes the zitter characteristic to deteriorate and a bit error rate (BER) to become larger. If the recording is performed in this state, the recording characteristics of the land and the groove may be changed, so that the quality of the recorded or reproduced data deteriorates, and thus the operation of the system becomes unstable in the same manner as described above.

SUMMARY OF THE INVENTION

Accordingly, the present invention is directed to a method of recording and reproducing an optical recording medium that substantially obviates one or more of the problems due to limitations and disadvantages of the related art.

An object of the present invention is to provide a method of recording and reproducing an optical recording medium which compensates for a defocus by detecting the amount of defocus offset during a normal focus from a tracking error signal detected in a free running state in which only a focus servo is turned on, storing the detected amount of defocus offset, and then applying the stored amount of defocus offset during normal recording and reproduction.

It is another object of the present invention to provide a method of recording and reproducing an optical recording medium which compensates for a tilt by detecting a tilt size of a disc from a tracking error signal detected in a free running state in which only a focus servo is turned on, detecting and storing a tilt direction from a focus error signal, and then applying the tilt size and the tilt direction during normal recording and reproduction.

It is still another object of the present invention to provide a method of recording and reproducing an optical recording medium which compensates for a tilt by detecting the tilt from a tracking center offset detected in specified positions of inner and outer peripheries of a disc in a free running state in which only a focus servo is turned on, storing the detected tilt, and then applying the stored tilt during normal recording and reproduction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the method of recording and reproducing an optical recording medium comprises the steps of detecting servo information in a plurality of determined positions while rotating the optical recording medium in a state in which only a focus servo is turned on when the optical recording medium is loaded, storing in a table, the servo information in the respective positions, and performing a servo of the corresponding positions by applying the servo information in the table during an actual data recording/reproduction.

In the embodiment, the servo information detecting step may further include the step of judging a time point when a level of a tracking error signal detected as the optical recording medium rotates becomes maximum to be a focus-on state, and detecting an amount of defocus offset at the time point.

The time point when the level of the tracking error signal becomes maximum may be detected by varying the amount of defocus offset.

The amount of defocus offset may be detected by obtaining a mean value of the tracking error signal.

The servo information detecting step may further include the steps of detecting a size and direction of a tilt in the focus-on state, adjusting the tilt to be a tilt-zero, and detecting adjusted values.

The servo information detecting step may comprise the steps of detecting the tracking error signal and the focus error signal by rotating the optical recording medium in the state in which only the focus servo is turned on in the determined positions, detecting a size of a tilt from a level of the tracking error signal and detecting a direction of the tilt by a difference value between the focus error signal and a predetermined reference level, detecting a tilt-zero by performing a tilt-servo with the detected tilt size and direction, and detecting a level of the tracking error signal and a level of the focus error signal when the tilt-zero is detected.

The tilt-zero detecting step may judge the tilt-zero if the level of the tracking error signal is maximum, and the difference value between the focus error signal and the reference level is within a determined range.

The storing step may store a defocus offset value in the focus-on state, the level of the tracking error signal in the tilt-zero state, and a difference value between the level of the focus error signal and a reference level as a reference value.

The servo performing step may comprise the steps of detecting the size of the tilt by detecting the level of the tracking error signal in the corresponding positions during the data recording/reproduction and comparing the detected tracking error signal level with a level of the tracking error signal stored as a reference value at the storing step, detecting a direction of the tilt by detecting the focus error signal in the corresponding position, obtaining the difference value between the detected focus error signal and the reference level, and then comparing the obtained difference value with a difference value stored as a reference value at the storing step, and performing a tilt servo with the detected tilt size and direction.

The tilt servo performing step may further include the step of detecting and compensating for a defocus of the corresponding position using a stored defocus offset value after adjustment of the tilt.

The servo information detecting step may comprise the steps of obtaining the tracking error signal in the respective positions while rotating the optical recording medium in specified positions of inner and outer peripheries of the optical recording medium, detecting the size of the tilt from a difference between the obtained tracking error signal of the inner and outer peripheries, and detecting the tilt-zero by adjusting the tilt in a direction that reduces the size of the tilt.

The size of the tilt may be detected from a difference value between center offsets of the tracking error signal in the respective positions.

The tilt direction detecting step detects the direction of the tilt from a sign of the difference value between center offsets of the tracking error signals in the respective positions.

In another aspect of the present invention, there is provided a method of recording and reproducing an optical recording medium comprising the steps of detecting a tracking error signal and a focus error signal by rotating the optical recording medium in a state in which only a focus servo is turned on when the optical recording medium is loaded, performing for respective determined positions, a process of detecting tilt information from the tracking error signal and the focus error signal, adjusting the tilt information to be a tilt-zero, and then storing the adjusted values as reference values, and performing a tilt servo for tilt compensation by applying the stored reference values in the corresponding positions during operation of the optical recording medium.

The tilt information detecting step detects the tilt information in a focus-on state.

According to an aspect of the present invention, there is provided a method of recording and reproducing an optical recording medium which performs a tracking servo and a focusing servo by irradiating a laser beam onto determined positions including lands and grooves of a track of the optical recording medium and detecting a tracking error signal and a focusing error signal using an electric signal from an optical pickup for picking up the laser beam reflected from the optical recording medium, the method comprising the steps of: detecting servo information in a plurality of the determined positions including lands and grooves of the track while rotating the optical recording medium in a state in which only the focus servo is turned on when the optical recording medium is loaded, storing the servo information of the respective determined positions as a table, and performing the servo of the corresponding positions by applying the servo information in table during an actual data recording/reproduction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given for illustration only, and thus are not limitative of the present invention, and wherein:

FIGS. 9A and 9B are views illustrating examples of a tracking error signal in which a track center offset varies according to a tilt in a free running state.

DETAILED DESCRIPTION OF THE PREFERRED EMBODIMENTS

Reference will now be made in detail to the preferred embodiments of the present invention, examples of which are illustrated in the accompanying drawings.

According to a method of recording and reproducing an optical recording medium, the time point at which a tracking error signal detected in a free running state that only a focus servo is turned on becomes maximum is judged to be a focus-on state, the amount of defocus offset at this time point is detected, and then a focus servo is performed according to the detected amount of defocus offset during an actual recording/reproduction. Also, the size and the direction of a tilt are detected from the tracking error signal and a focus error signal in the focus-on state, the detected value is adjusted to a tilt-zero, the adjusted value is stored, and then the tilt is compensated for by applying the adjusted value during the actual recording/reproducing. This process is respectively performed in a plurality of determined positions including inner and outer peripheries of the disc.

The free running state refers to the state in which the tracking error signal is detected by an amount as much as the amount of eccentricity of the disc in a state in which only the focus servo is turned on and the tracking servo is turned off, while the pickup is fixed and the disc is rotated.

Figure 1:
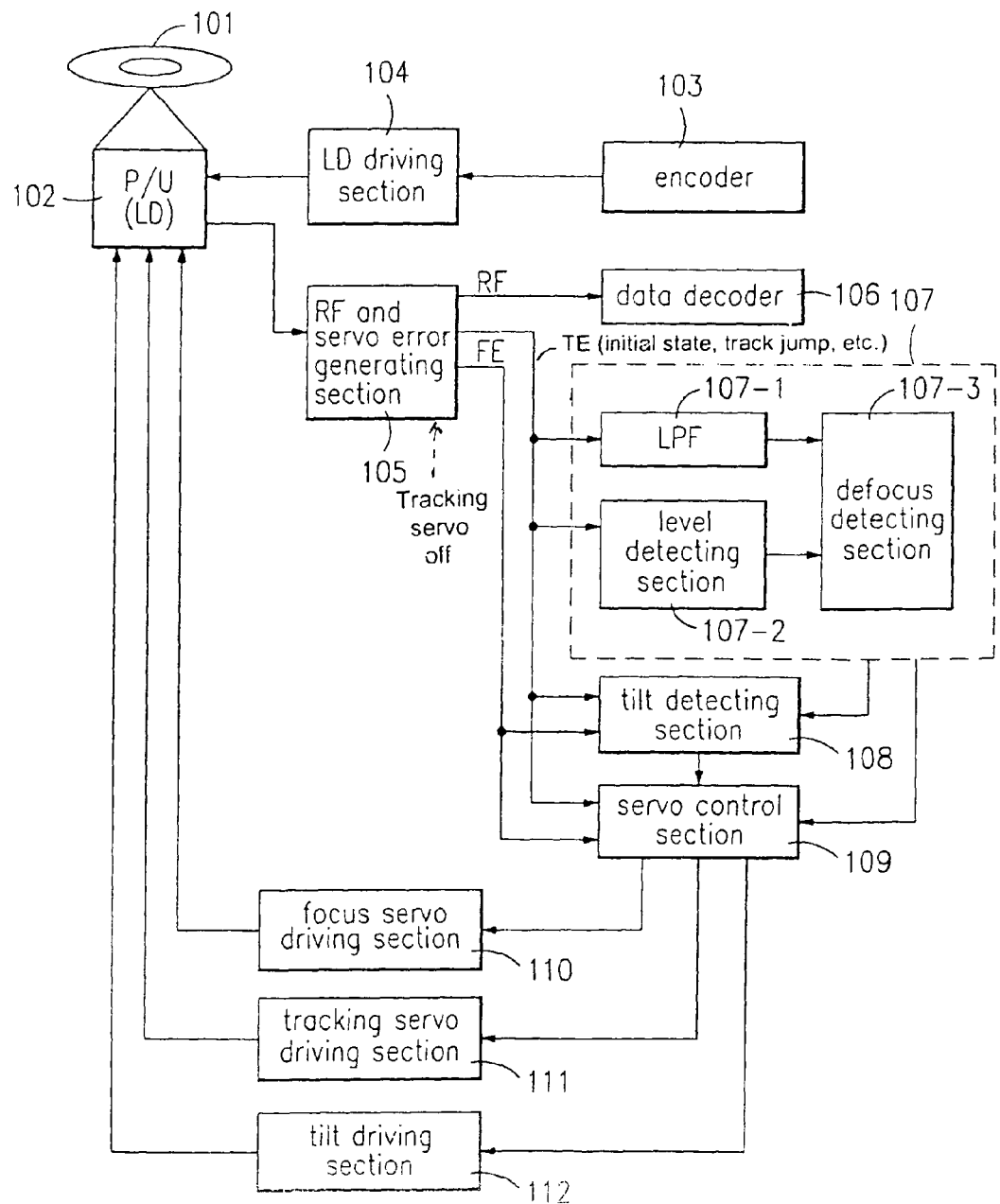
FIG. 1 is a block diagram illustrating the construction of an apparatus for recording and reproducing an optical recording medium according to the present invention.

FIG. 1 is a block diagram illustrating the construction of an apparatus for recording and reproducing an optical recording medium according to the present invention for detection and compensation of the defocus and tilt.

Referring to FIG. 1, the apparatus according to the present invention includes a data-rewritable optical disc 101, an optical pickup 102 for recording and reproducing information on the optical disc 101, a radio frequency (RF) and servo error generating section 105 for generating an RF signal and a servo error signal from an electric signal outputted from the optical pickup 102, an encoder 103 for encoding data which is to be recorded on the optical disc 101 to a write pulse of a format required by the optical disc 101 according to a control signal outputted from the RF and servo error generating section 105 when the data is generated, a laser diode (LD) driving section 104 for converting the write pulse outputted from the encoder 103 into a write power of a laser diode (LD) in the optical pickup 102 and driving the LD by the write power, a data decoder 106 for restoring the data by processing the RF signal detected by the RF and servo error generating section 105, a defocus discriminating section 107 for detecting a defocus from a tracking error signal outputted from the RF and servo error generating section 105, a tilt detecting section 108 for detecting a tilt from the tracking error signal and the focus error signal outputted from the RF and servo error generating section 105, a servo control section 109 for generating a tracking drive signal by processing the tracking error signal TE outputted from the RF and servo error generating section 105, generating a focus drive signal which corresponds to the size and direction of the defocus detected by the defocus discriminating section 107, and generating a tilt drive signal which corresponds to the size and direction of the tilt detected by the tilt detecting section 108, a focus servo driving section 110 for compensating for the defocus by controlling the optical pickup 102 in accordance with the focus drive signal outputted from the servo control section 109, a tracking servo driving section 111 for receiving the tracking drive signal outputted from the servo control section 109 and driving a tracking actuator in the optical pickup 102 accordingly, and a tilt driving section 112 for compensating for the tilt by controlling the optical pickup 102 in accordance with the tilt drive signal outputted from the servo control section 109. Here, the tilt driving section 112 is a tilt servo mechanism which compensates for the tilt by moving the optical pickup or the disc itself.

The defocus discriminating section 107 comprises a low pass filter (LPF) 107-1 for taking the mean of the tracking error signal TE by low-pass-filtering the tracking error signal, a level detecting section 107-2 for detecting a level TEvpp of the tracking error signal TE, and a defocus detecting section 107-3 for detecting the amount of defocus offset during a normal focus using an output of the LPF 107-1 and an output of the level detecting section 107-2.

Figure 2:
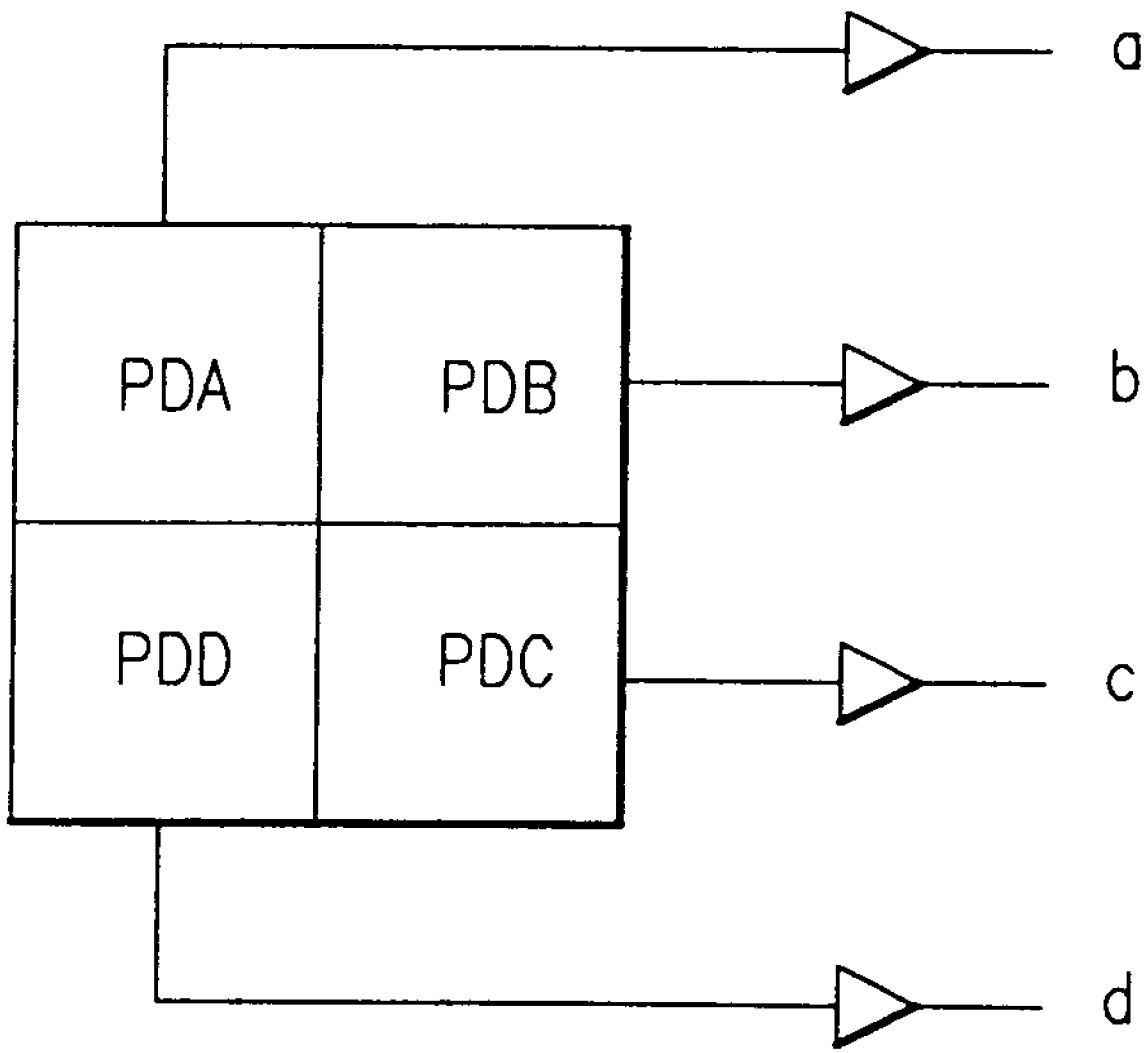
FIG. 2 is a view illustrating an example of an optical detector in FIG. 1.

Also provided in the optical pickup 102 is an optical detector for detecting the quantity of light of a beam and converting the light quantity into an electric signal. As shown in FIG. 2, the optical detector may comprise four optical detecting elements PDA, PDB, PDC, and PDD separately located in signal track and radial directions of the optical disc 101, respectively.

According to the present invention, the optical disc 101 has signal tracks composed of lands and grooves, and the data can be recorded or reproduced on the tracks of both the lands and the grooves.

Accordingly, when the optical disc 101 is placed or recorded/reproduced, the laser light emitted from the laser diode of the optical pickup 102 is beamed onto the signal track of the rotating optical disc 101, and the reflected light from the track is incident to the optical detector.

The optical detector is composed of a plurality of optical detecting elements and electric signals which are proportional to the amounts of light obtained through the respective optical detecting elements are outputted to the RF and servo error generating section 105.

If the optical detector is constructed as shown in FIG. 2, the optical detector outputs to the RF and servo error generating section 105 the electric signals a, b, c, and d which are proportional to the amounts of light obtained from the respective detecting elements PDA, PDB, PDC, and PDD.

The RF and servo error generating section 105 generates an RF signal required for data reproduction, a read channel 2 signal required for servo control, a focus error signal, etc., by combining the electric signals a, b, c, and d.

Here, the RF signal can be obtained by computing (a+b+c+d) with respect to the electric signals a, b, c, and d outputted from the optical detector, the read channel 2 signal can be obtained by computing (a+d)−(b+c), and the tracking error signal TE can be obtained by processing the read channel 2 signal. Also, the focus error signal FE can be obtained by computing (a+c)−(b+d) with respect to the electric signals a, b, c, and d outputted from the optical detector.

If the optical detector is composed of two optical detecting elements which are separated in the track direction, from the balance of quantity of light of two photodiodes I1 and I2 are detected the RF signal=(I1+I2) and the read channel 2 signal= (I1−I2). In FIG. 2, a+d corresponds to I1, and b+c corresponds to I2.

At this time, the RF signal is outputted to the data decoder 106, the servo error signals such as FE and TE are outputted to the defocus discriminating section 107, tilt detecting section 108, and servo control section 109, and the control signal for data write is outputted to the encoder 103.

The encoder 103 encodes the data to be recorded to the write pulse of the format required by the optical disc 101 according to the control signal, and outputs the write pulse to the LD driving section 104. The LD driving section 104 drives the LD of the optical pickup 102 by the write power which corresponds to the write pulse to write the data on the optical disc 101.

The data decoder 106 restores the original data from the RF signal detected by the RF and servo error generating section 105 when the data recorded on the optical disc 101 is reproduced.

The servo control section 109 processes the tracking error signal TE, and outputs the driving signal for tracking control to the tracking servo driving section 111.

The tracking servo driving section 111 moves the object lens in the optical pickup 102 in the radial direction by driving the tracking actuator in the optical pickup 102, and corrects the position of the beam to follow the track.

Meanwhile, the defocus discriminating section 107 detects the defocus using the tracking error signal TE obtained by processing the read channel 2 signal.

The detection of the defocus is respectively performed in a plurality of determined positions on the inner and outer peripheries of the disc when the system is initialized. That is, if the disc is loaded, the defocus offset value by which the defocus is zero is searched in the first determined position.

For instance, if the disc is loaded, the RF and servo error generating section 105 generates the RF signal and the servo error signals in the free running state in which only the focus servo is turned on, and outputs the tracking error signal TE among the servo error signals to the defocus discriminating section 107.

Specifically, if the optical pickup 102 is fixed and only the optical disc 101 is rotated in the free running state in which the focus servo is turned on and the tracking servo is turned off, the tracking error signal TE is detected due to the eccentric disc.

The following Table 1 shows the level variation of the tracking error signal which is changed according to the defocus offset when only the focus servo is turned on and the tracking servo is turned off in a tilt-zero (i.e., mechanism 0) state.

TABLE 1

| Defocus Offset[ ] | TE Level[TEvpp] |
|---|---|
| 0.0 | |
| 1.0 | 5.1 |
| 2.0 | 9.0 |
| 3.0 | 11.3 |
| 4.0 | 13.3 |
| 5.0 | 15.1 |
| 6.0 | 14.0 |
| 7.0 | 13.5 |
| 8.0 | 9.7 |
| 9.0 | 5.7 |
| 10.0 | 2.7 |

Figure 4:
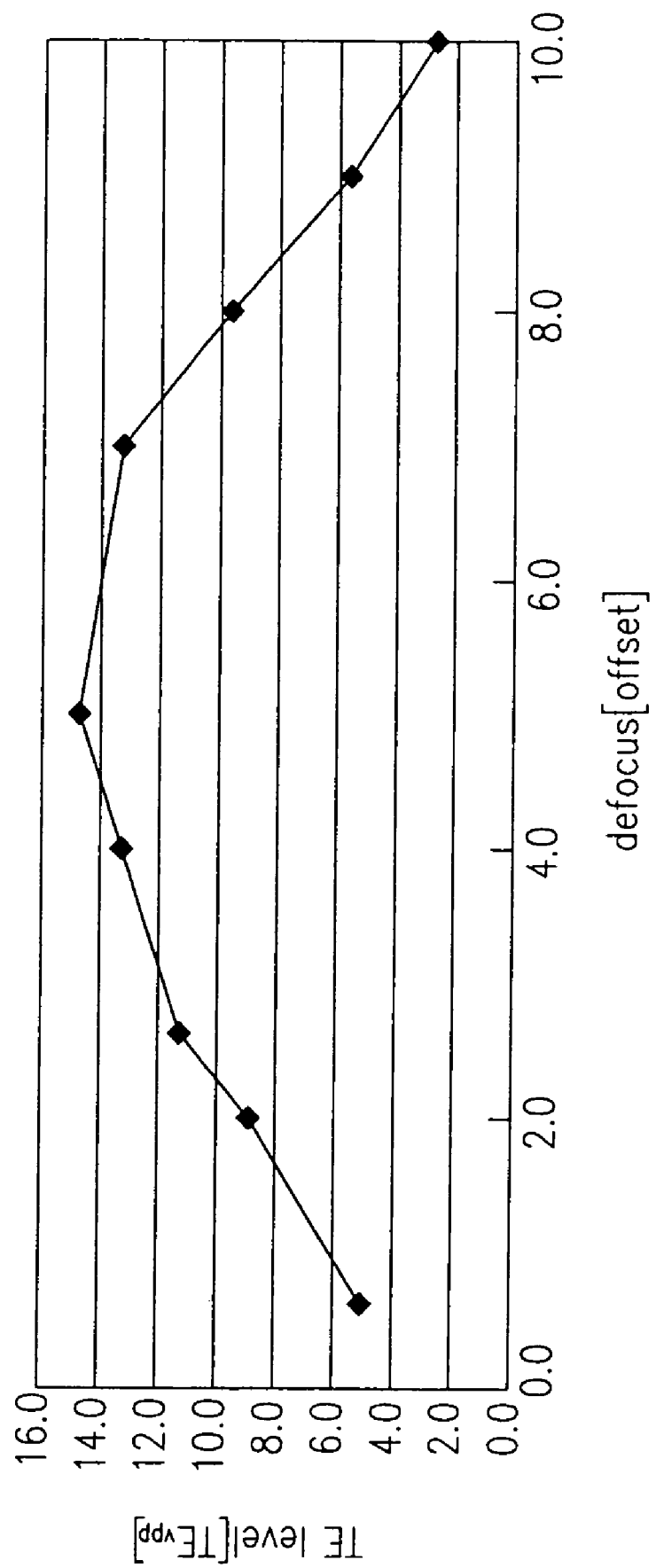
FIG. 4 is a graph exemplifying the level variation of a tracking error signal due to the variation of defocus offset in a free running state.

FIG. 4 is a graph representing the contents of Table 1. In case that the defocus does not occur, i.e., in case of a normal focus, the level of the tracking error signal TE becomes maximum, while in case of the defocus, its size is reduced in proportion to the degree of the defocus. If it is assumed that Table 1 represents determined positions, the point at which the defocus offset amount is 5.0 becomes the defocus zero point.

The defocus discriminating section 107 detects the level TEvpp of the tracking error signal as changing the defocus offset in the determined positions, judges the time point at which the level becomes maximum as the focus-on state, and stores the corresponding level of the tracking error signal and the defocus offset amount.

This process is respectively performed in the plurality of determined disc positions.

The defocus detecting method in the determined specified positions will now be explained in detail.

The level detecting section 107-2 of the defocus discriminating section 107 detects the level TEvpp of the tracking error signal, and outputs the detected level to the defocus detecting section 107-3. The defocus detecting section 107-3 detects the defocus offset amount at the time point at which the level TEvpp of the tracking error signal is at a maximum as changing the defocus offset, and stores the level TEvpp of the tracking error signal at this time, and stores the defocus offset amount.

At this time, as shown in FIG. 4, the tracking error signal becomes distorted and asymmetric according to the defocus offset. For instance, as the defocus offset goes below 6, the waveform of the tracking error signal becomes unbalanced.

Accordingly, if the mean value of the level TEvpp of the tracking error signal is obtained and then the defocus offset value is detected by the mean value, the position where the defocus does not exist, i.e., the position of the normal focus can be detected during a short time. This is because the focus servo is performed only in the position where no defocus exists according to the mean value.

At this time, the LPF 107-1 can detect the mean value of the level of the tracking error signal, Tevpp, by filtering the tracking error signal, TE. If the distortion scarcely exists, the waveform corresponding to the mean value becomes nearly a straight line.

Figure 5A:
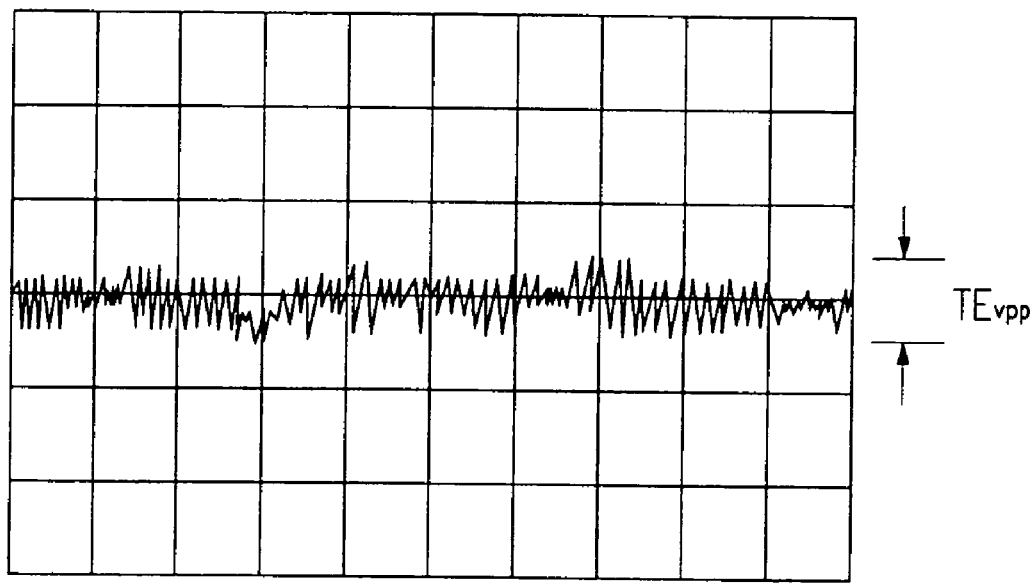
FIGS. 5A to 5E are waveform diagrams illustrating the level variation of a tracking error signal due to the variation of defocus offset.
Figure 5B:
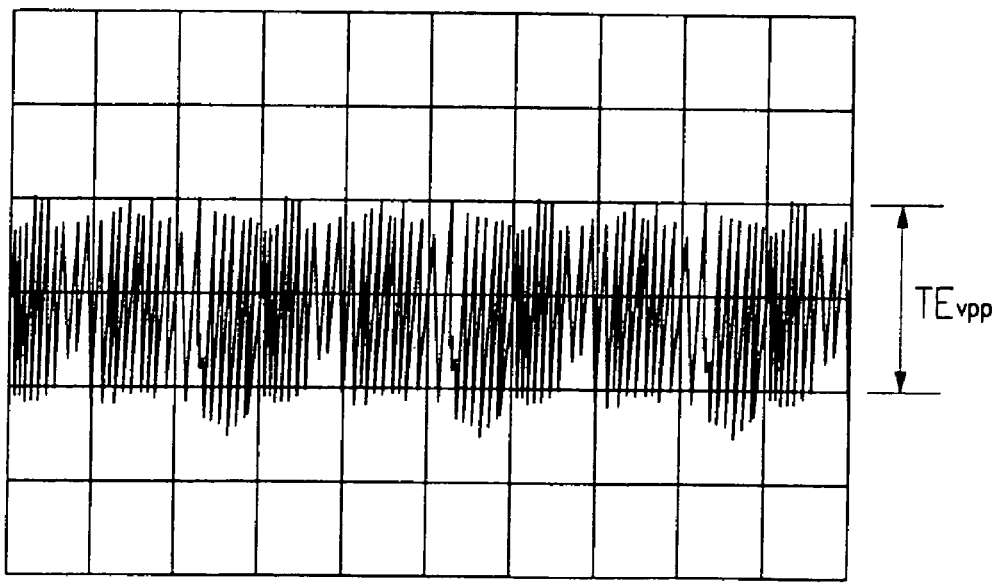
Figure 5C:
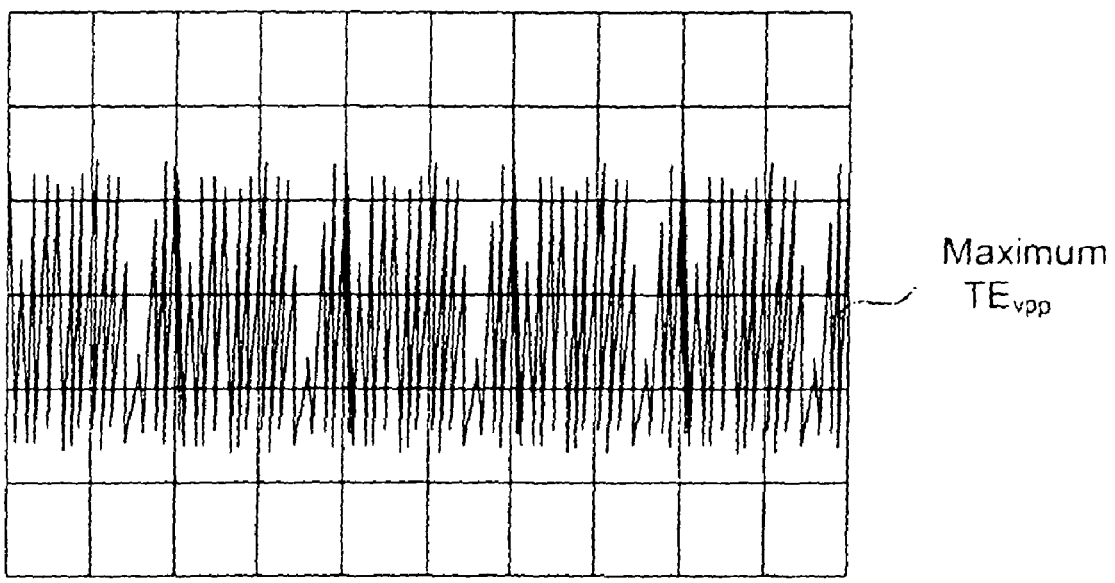

FIGS. 5A to 5E are waveform diagrams illustrating the variation of the level TEvpp of the tracking error signal, which is detected in the free running state in which only the focus servo is turned on and the tracking servo is turned off, according to the defocus offset. Since the level Tevpp of the tracking error signal shown in FIG. 5C is the greatest, the corresponding time point is judged to be the focus-on state, and this level TEvpp of the tracking error signal and the defocus offset amount are stored.

Figure 5D:
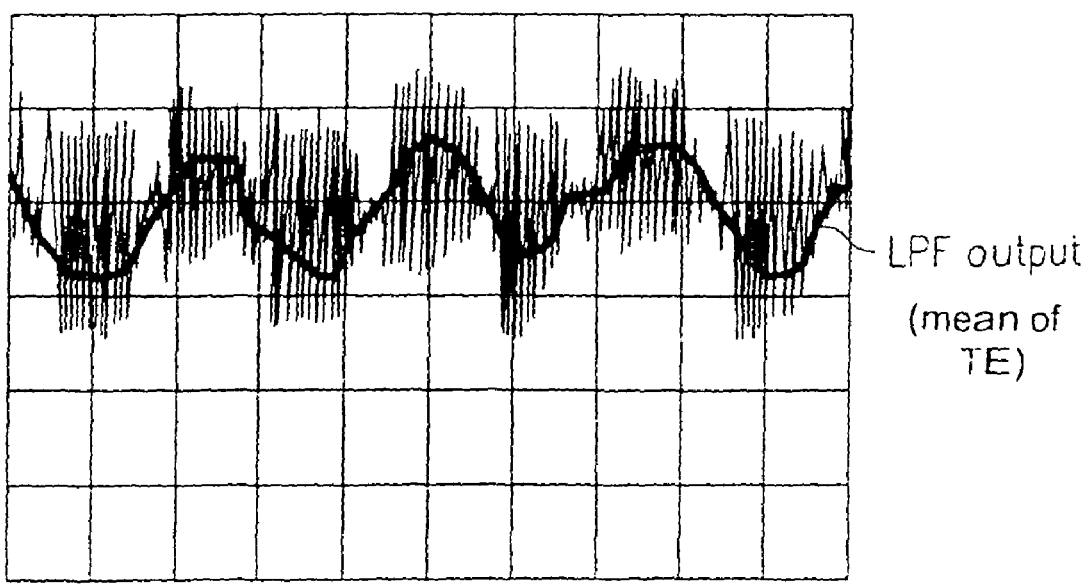
Figure 5E:
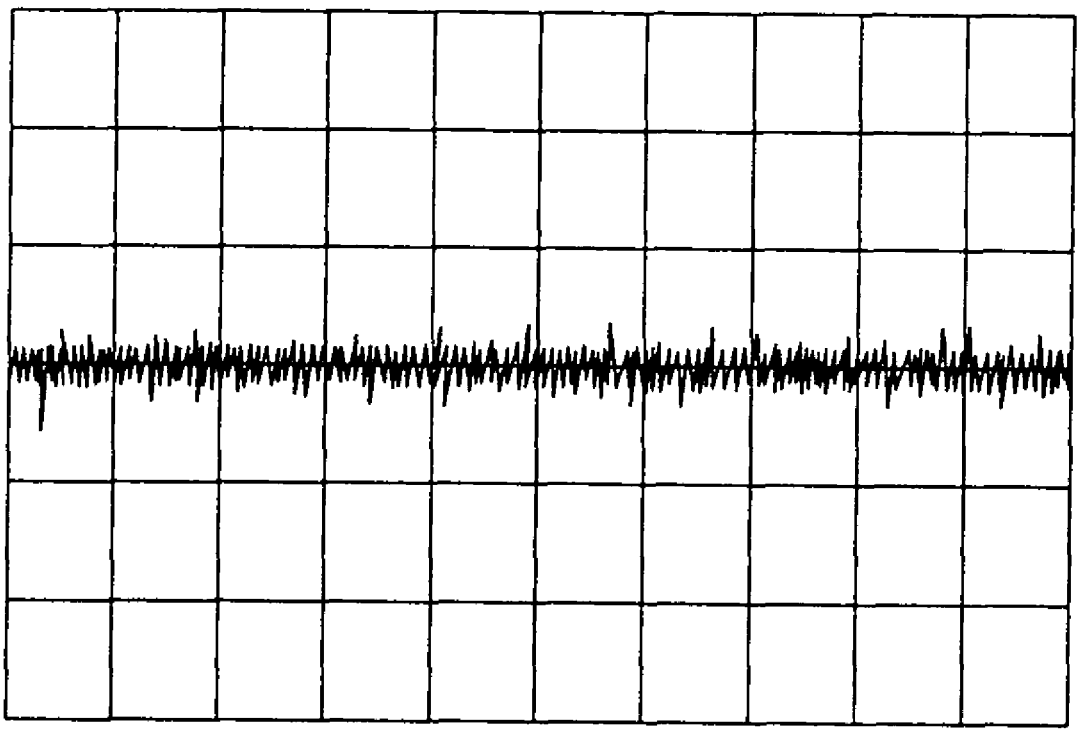

FIG. 5D shows the output of the LPF 107-1, i.e., the mean value of the level TEvpp of the tracking error signal, in which a severe distortion occurs. Thus, the focus servo is not performed in the direction in which the level becomes smaller than the defocus offset.

The levels TEvpp of the tracking error signal corresponding to the focus-on in the respective determined positions and the defocus offset amounts are stored in a table.

At this time, the defocus offset amounts corresponding to the maximum level TEvpp of the tracking error signal in the respective positions are similar, but not identical. This is because the positional deviations of the disc (for instance, reflection rate and recording medium property) are slightly different from one another.

Thereafter, the focus offset difference between the land and the groove can be obtained by comparing the two defocus offset amounts of the land and the groove.

Then, if the focusing reaches the corresponding determined position during the actual data recording/reproduction, the focus servo is performed by the defocus offset amount stored in the position.

Specifically, the servo control section 109 generates the focus drive signal corresponding to the defocus offset amount stored in the predetermined position during a track jump such as a seek or the actual data recording/reproduction, and the focus servo driving section 110 drives the focus actuator in the optical pickup in accordance with the focus drive signal. For example, in the actual data recording/reproduction, the level of the tracking error signal and the defocus offset value are obtained in the specified determined position, the level of the tracking error signal previously stored in the free running state and the defocus offset value are compared, and the compensation is performed in the direction in which the level of the tracking error signal becomes maximum by an amount as much as the difference between the tracking error signal level and the defocus offset value.

Accordingly, the time required for searching the focus-on during the track jump or actual recording/reproduction can be reduced, and thus the focus servo is quickly stabilized, so that the recording/reproduction of the data can be accurately performed.

In the embodiment of the present invention, the defocus offset value corresponding to the focus-on state when the system is initialized is detected, but this may be changed according to the kind of disc.

For instance, since a quick stabilization of servo is important to the DVD-RAM which performs a random access, it is preferable that the defocus offset amount during the normal focus is obtained and stored when the system is initialized, and then the focus servo is performed by the stored value during the actual recording/reproduction. In case of the DVD-R or DVD-RW which performs a serial access, it does not matter a great deal, even though the recording is performed somewhat late, and thus the focus servo can be performed by changing the defocus offset through the above-described process and detecting the defocus offset value corresponding to the normal focus during the actual recording/reproduction.

Meanwhile, according to the present invention, a tilt is also detected. The tilt is detected in the free running state, and at this time, the defocus should be zero, i.e., the focus-on state should be effected. The defocus zero is discriminated by applying the above-described defocus detecting method. That is, the time point at which the defocus is zero in the corresponding position is searched, and the tilt is detected at that time point.

The tilt detection according to first and second embodiments of the present invention will now be explained. At this time, the detection of the state in which the defocus is zero is performed using the above-described defocus method.

First Embodiment

According to the first embodiment of the present invention, the tilt detection is respectively performed in a plurality of determined positions on the inner and outer peripheries of the disc when the system is initialized.

For instance, if the disc is loaded, the RF and servo error generating section 105 detects the tracking error signal and the focus error signal in the free running state in which only the focus servo is turned on, and outputs the detected tracking and focus error signals to the tilt detecting section 108 and the servo control section 109. The tracking error signal is detected by the eccentric disc if the optical pickup 102 is fixed and only the optical disc 101 is rotated in the state in which the focus servo is turned on and the tracking servo is turned off.

Figure 6:
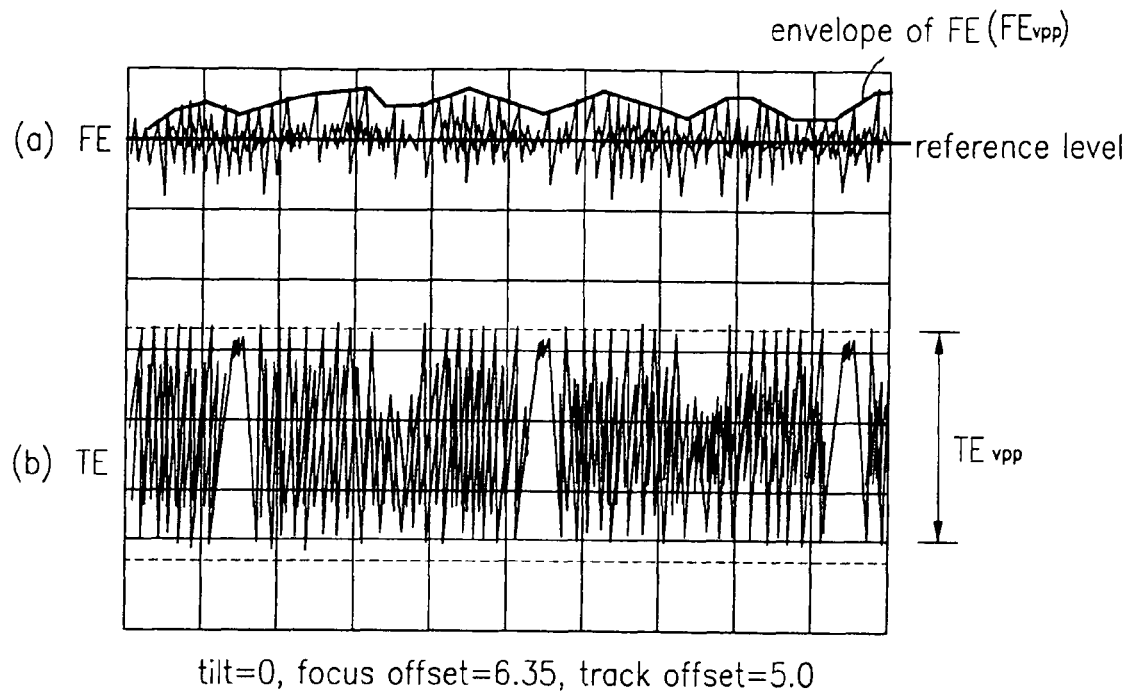
FIGS. 6 to 8 are graphs exemplifying that a focus error signal (a) and a tracking error signal (b) detected at a free running state vary according to a tilt.
Figure 7:
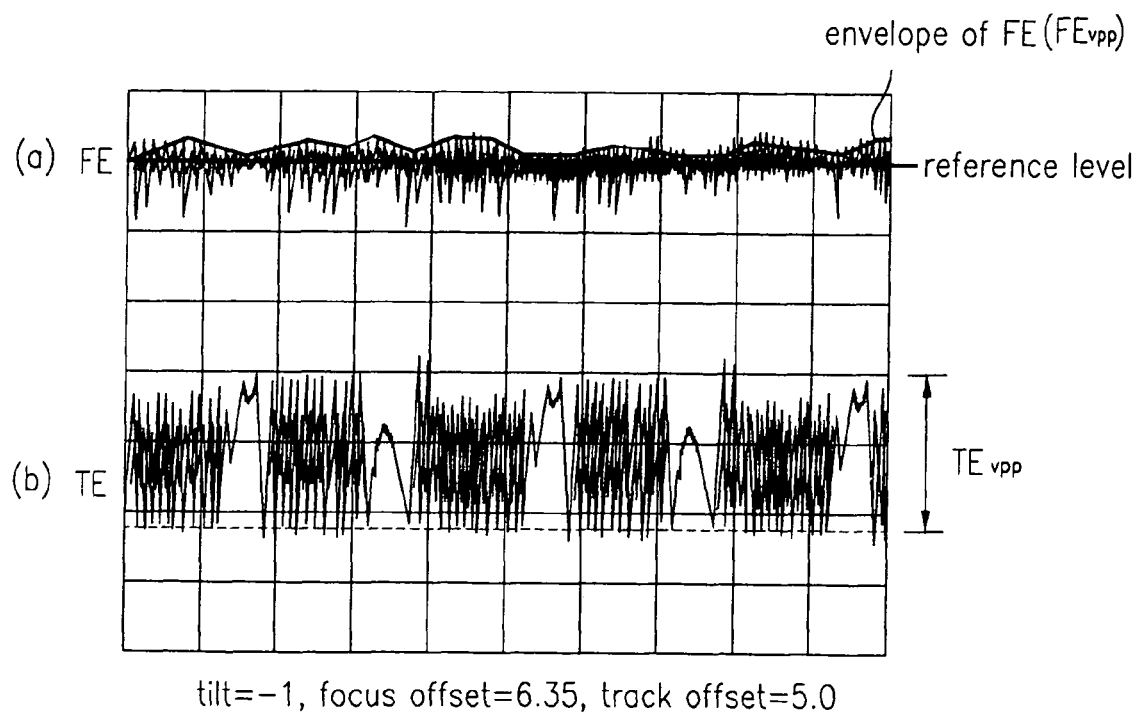
Figure 8:
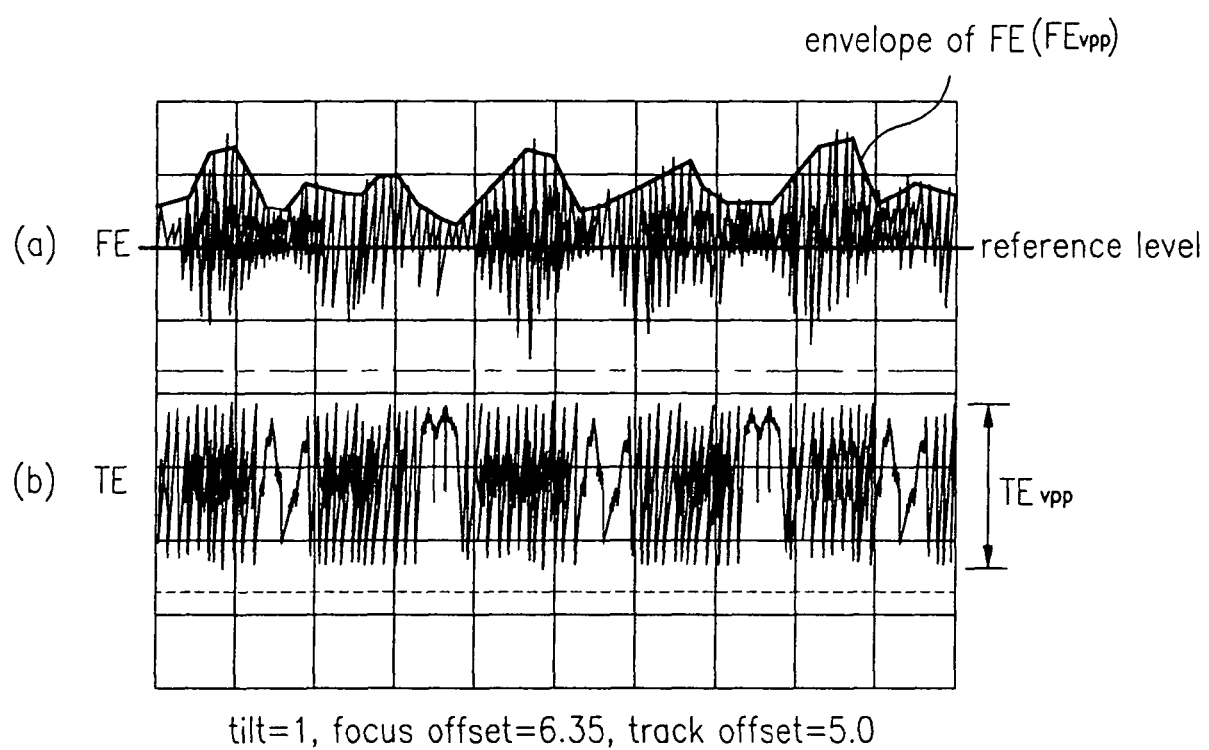

FIGS. 6 to 8 are graphs exemplifying that the tracking error signal and the focus error signal, which are detected in the free running state in which the focus servo is turned on and the tracking servo is turned off with the focus and track offset fixed, are changed. In FIGS. 6 to 8, (a) shows the relationship between the envelope waveform FEvpp detected from the focus error signal and the reference level, and (b) shows the change of the level TEvpp of the tracking error signal.

Specifically, the level of the tracking error signal as shown as (b) of FIG. 6 is greatest, and if the difference between the focus error signal of (a) and the reference level is within the predetermined range, it is judged that no tilt exists, i.e., tilt-zero.

Here, the envelope waveform FEvpp of the focus error signal of (a) is obtained by low-pass-filtering the focus error signal, or by holding the peak of the focus error signal. The reference level may be a ground level, or a DC level (for example, 2V or 2.5V) in the normal focus position at which the best focus is effected. Accordingly, the tilt detecting section 108 can be provided with the envelope waveform of the focus error signal from the LPF 107-1 of the defocus discriminating section 107. Also, the reference level can be known from the output of the defocus detecting section 107-3.

If the range for detecting the tilt direction is determined to be $V_{LOW}$ to $V_{HIGH}$, and the electric potential difference $V_{FE}$ between the focus error signal of (a) of FIG. 6 and the reference level is within the range (i.e., $V_{LOW} \leq V_{FE} \leq V_{HIGH}$), the level of the tracking error signal of (b) becomes maximum, and the tilt is zero.

Meanwhile, FIGS. 7 and 8 exemplify that the tilt occurs. According to (a) of FIG. 7, the difference $V_{FE}$ between the envelope of the focus error signal and the reference level becomes smaller, and according to (a) of FIG. 8, the difference $V_{FE}$ between the envelope of the focus error signal and the reference level becomes larger. In other words, the difference between the focus error signal and the reference level deviates from the determined range of $V_{LOW}$ to $V_{HIGH}$.

Also, according to (b) of FIG. 7 and (b) of FIG. 8, the level TEvpp of the tracking error signal becomes smaller in comparison to (b) of FIG. 6, and this means that the level is not maximum. As a result, the tilt occurs in the state as shown in FIGS. 7 and 8.

Accordingly, it is discriminated whether the difference value between the focus error signal and the reference level comes into the determined range of $V_{LOW}$ to $V_{HIGH}$ in a state in which the level TEvpp of the tracking error signal is maximum as the tilt is adjusted in the corresponding position.

At this time, the tilt direction can be obtained by the difference value between the focus error signal and the reference level. In other words, it can be determined whether the disc is bent upward or downward. Accordingly, the tilt is adjusted in a direction that the difference value between the focus error signal and the reference level becomes larger if the difference level is smaller than $V_{LOW}$, while the tilt is adjusted in a direction that the difference value becomes smaller if the difference value is bigger than $V_{HIGH}$. The tilt adjustment is performed until the level TEvpp of the tracking error signal becomes maximum, and thus the tilt size can be identified by the level TEvpp of the tracking error signal.

The tilt detecting section 108 detects the direction and the size of the tilt, and outputs the detected tilt direction and size to the servo control section 109. The servo control section 109 generates and outputs to the tilt driving section 112 the tilt drive signal corresponding to the tilt size and direction. The tilt driving section 112 directly controls the tilt by moving the disc or the optical pickup in a positive (+) or negative (−) direction according to the tilt drive signal, i.e., as much as the tilt size.

If the difference value between the focus error signal and the reference level comes into the determined range of $V_{LOW}$ to $V_{HIGH}$ as the level of the tracking error signal is maximum by adjusting the tilt in the corresponding position, the level TEvpp of the tracking error signal at the time and the difference value between the focus error signal and the reference level are stored as the reference value in the corresponding position.

This process is respectively performed in a plurality of determined positions to detect and store the reference values in the respective positions in a table.

Thereafter, if the tilt adjustment reaches the corresponding position during the search (or seek) such as the track jump or the actual data recording/reproduction, the current level TEvpp of the tracking error signal in the position and the difference between the focus error signal and the reference level are obtained, and the tilt is detected and adjusted by comparing the obtained values with the reference values of the corresponding position in table.

For example, if the reference value stored in the position as the difference value between the focus error signal and the reference level is $V_{REF1}$, and the reference value stored as the level TEvpp of the tracking error signal is $V_{REF2}$, the current tilt direction can be obtained by comparing the difference value between the focus error signal detected in the corresponding position during the data recording/reproducing or the search and the reference level with the reference value $V_{REF1}$. Also, the current tilt size can be obtained by comparing the level TEvpp of the tracking error signal detected in the corresponding position with the reference value $V_{REF2}$.

If $\alpha$ is a value obtained by subtracting the reference value $V_{REF1}$ from the difference value between the focus error signal and the reference level, the sign of $\alpha$ represents the direction of the tilt. If $\beta$ is a value obtained by subtracting the reference value $V_{REF2}$ from the level TEvpp of the tracking error signal, the value of $\beta$ represents the size of the tilt.

Accordingly, if the sign of $\alpha$ is negative (−), the tilt is compensated by an amount as much as $\beta$ in the positive (+) direction, while if the sign of $\alpha$ is positive (+), the tilt is compensated by an amount as much as $\beta$ in the negative (−) direction.

This process is identically applied to the respective corresponding positions.

Accordingly, since the servo control section 109 directly controls the size and the direction of the tilt by the value adjusted in the predetermined positions during the actual data recording/reproduction or the search such as the track jump, the time required for detecting and adjusting the tilt can be reduced, and the servo can be quickly stabilized, thereby enabling a real-time servo.

Second Embodiment

In the second embodiment of the present invention, the detection of the tilt is performed in the free running state, when the system is initialized. Specifically, when a disc is loaded in the free running state in which only the focus servo is turned on, the RF and servo error generating section 105 detects a tracking error signal and outputs it to the tilt control section 108 and the servo control section 109.

At that time, if the tilt does not occur, the center value of the tracking error signal has the same value on the inner or outer peripheries of the disc as shown in FIG. 9A.

Figure 9B:
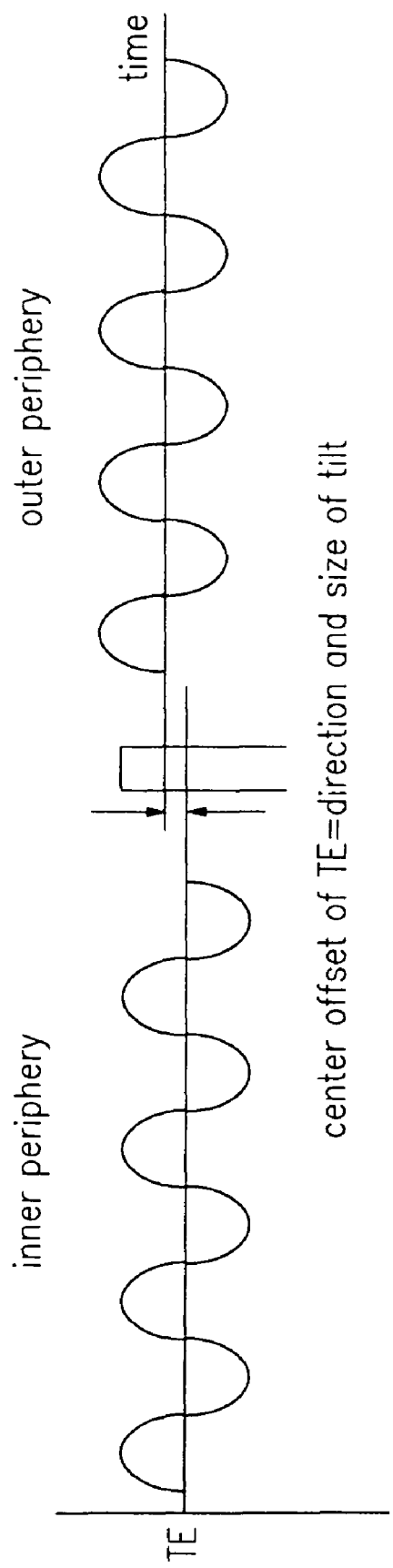

By contrast, if the tilt occurs, the center offset of the tracking error signal is produced as shown in FIG. 9B. In other words, the center value of the tracking error signal detected on the inner and outer peripheries differs depending on the tilt.

Therefore, if the center value of the tracking error signal is detected at a predetermined position of the inner and outer peripheries in the free running state, and the difference between the two center values is determined, the size and direction of the tilt can be known.

Assuming that the difference between the center value of the tracking error signal obtained on the inner periphery and the center value of the tracking error signal obtained on the outer periphery is $\gamma$, the level of the tilt may be determined by using the value $\gamma$, and also the direction of the tilt may be known by using the signal of the value $\gamma$. Therefore, if the sign of the value $\gamma$ is negative, the tilt is compensated for the value $\gamma$ in a positive direction. If the sign of the value $\gamma$ is positive, the tilt is compensated for the value $\gamma$ in a negative direction. Specifically, the tilt is compensated for in the direction of reducing its size to become a tilt-zero. If the tilt-zero is detected, the center level of the tracking error signal and the center offset are stored.

Specifically, the tilt detecting section 108 determines the size and direction of the tilt by using the above-described method, and outputs the resultant value to the servo control section 109. The servo control section 109 converts the size and direction of the tilt to a tilt drive signal by signal-processing the size and direction of the tilt, and outputs the resultant value to the tilt driving section 112.

The tilt driving section 112 controls the tilt by moving the disc or the optical pickup in the positive or negative direction depending on the tilt driving signal, i.e., the size of the tilt.

If the tilt is detected in several positions by using the above-described method, the inclination trace of the disc can be made to extract the whole tilt of the disc.

At that time, after the size and direction of the tilt determined by using the above method in the respective position is stored, if the size and direction reaches the interested position during the search (or seek) such as a track jump, or the data recording/reproduction, the time for detecting the tilt in the respective position is not needed for adjusting the tilt in the direction of reducing the size of the tilt stored in the position. As a result, this stabilizes the servo quickly, and enables the real time recording.

The present invention can detect and adjust the size of the tilt between the optical axis and the disc surface when adjusting the tilt or performing the servo by using one of the above-described methods.

At that time, if the defocus and the tilt are not detected, the defocus-zero state is first detected in the free running state at the predetermined position, and then the tilt is detected. The detected tilt is adjusted to be a tilt-zero, and then the adjusted value and the defocus offset value of defocus-zero state are stored.

Performing the above process at the respective positions, the trace of defocus and the tilt of the disc can be obtained, thereby extracting the whole defocus and tilt from the trace.

If it reaches the interested position during the search (or seek) such as the track jump, or the data recording/reproduction, the tilt and the defocus are controlled in a counter direction to that of the trace.

Figure 3:
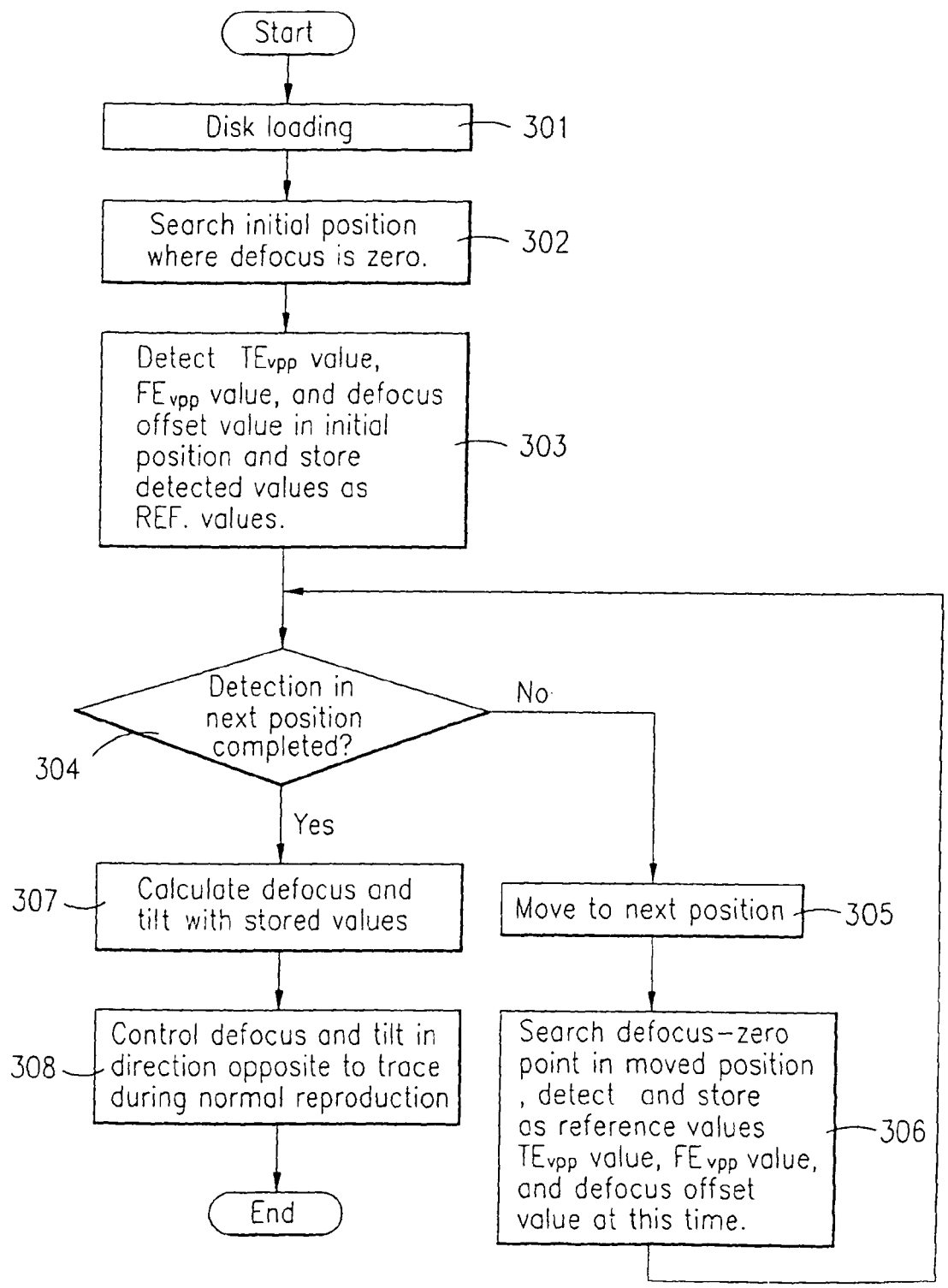
FIG. 3 is a flowchart illustrating the method of recording and reproducing an optical recording medium according to an embodiment of the present invention.

FIG. 3 shows another embodiment of the present invention, in which the detection and compensation of the tilt are performed by the first embodiment.

Specifically, if the disc is loaded (step 301), the position at which the defocus is zero in the initial position set by the above method is searched (step 302). At that time, the level TEvpp of the tracking error signal, the level FEvpp of the focus error signal, and the value of defocus offset are stored as a reference value (step 303).

It is determined whether the detection of the tilt in the set positions is completed (step 304), and if it is not, the detection of the tilt is performed in another set position (step 305). Then, the position at which the level of the tracking error signal is at a maximum is searched by changing the offset value of the defocus. When the position is searched, the size and direction of the tilt is detected by using the level of the tracking error signal and the focus error signal, and the tilt servo is adjusted to the tilt-zero.

Thereafter, the offset value of the defocus, the level TEvpp of the tracking error signal, and the level FEvpp of the focus error signal are stored as a reference value (step 306).

If the information on the defocus-zero and the tilt-zero in all of the set positions are detected and stored, the tilt and defocus trace are calculated by using the stored reference value (step 307). If the interested position is reached during the search (or seek) such as the track jump, or the data recording/reproduction, the tilt and the defocus are controlled in a counter direction to that of the trace (step 308). In other words, the tilt and the defocus are controlled so that the level TEvpp of the tracking error signal obtained at the interested position is within the margin of the tracking error signal stored as the reference value. The difference value between the level of the focus error signal and the reference level must be within the margin of the stored reference value.

At that time, the tilt is first detected and compensated for in the interested position. Then, the defocus is compensated for in order to perform the fine adjustment, i.e., the defocus offset may be used for verification after the tilt is adjusted.

The method of recording and reproducing an optical recording medium according to the present invention detects the defocus and the tilt of the optical recording medium and compensates for the detected defocus and tilt in a high-density optical recording medium. In the free running state in which only the focus servo is turned on, the amount of the defocus offset that corresponds to the maximum level of the tracking error signal is detected in a plurality of positions on inner and outer peripheries of a disc, and the tilt-zero in the respective position is detected and stored so that the tilt servo and the focus servo are performed with the value stored in the corresponding position during an actual recording/reproduction. The method can prevent the deterioration of quality of data due the defocus during the recording/reproduction, thereby enabling a real time recording by quickly stabilizing the focus servo, and operates the system stably.

Also, the method can follow corresponding tracks with a rapid stabilization of the servo during a search or seek, and detect and compensate for the tilt stably and accurately without using a separate light-receiving element in the high-density optical disc. Also, the method can prevent the deterioration of quality of data and a detrack due to the tilt during the recording/reproduction, and thus achieve stable operation of the system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method comprising:
    detecting servo information in a plurality of determined positions of an optical recording medium, including lands and grooves of a track, in a free running state in which a focus servo of an optical device is turned on and a tracking servo of the optical device is turned off;
    storing the servo information of respective positions of the plurality of determined positions; and
    performing a servo control operation at the respective positions by applying the servo information during recording or reproducing data, wherein the detecting the servo information comprises:
    detecting a tracking error signal while varying defocus offset; and
    detecting a value of the defocus offset at which a level of the tracking error signal corresponds to a maximum value, and wherein the detecting the value of the defocus offset comprises:
    obtaining a mean value of the tracking error signal; and
    detecting the value of the defocus offset in response to obtaining the mean value of the tracking error signal.

2. The method of claim 1, wherein the obtaining the mean value of the tracking error signal comprises low-pass filtering the tracking error signal.

3. The method of claim 1, wherein the performing the servo control operation comprises:
    detecting a size of a tilt by detecting a level of the tracking error signal in the respective positions of the plurality of determined positions during recording or reproducing data;
    comparing the level of the tracking error signal in the respective positions of the plurality of determined positions with a level of the tracking error signal stored as a first reference value;
    detecting a direction of the tilt by detecting a focus error signal in the respective positions;
    obtaining a value of a difference between the focus error signal and a reference level;
    comparing the value of the difference between the focus error signal and the reference level with a value stored as a second reference value; and
    performing a tilt servo control operation with the size of the tilt and the direction of the tilt.

4. The method of claim 3, wherein the performing the servo control operation further comprises:
  detecting and compensating for a defocus of the respective positions of the plurality of determined positions by using a value of the defocus offset after adjustment of the tilt, wherein the value of the defocus offset after the adjustment of the tilt is a stored value.

5. The method of claim 1, wherein the performing the servo control operation comprises:
  detecting a size of a tilt by detecting a level of the tracking error signal in the respective positions during a track jump;
  comparing the level of the tracking error signal in the respective positions with a level of the tracking error signal stored as a first reference value;
  detecting a direction of the tilt by detecting a focus error signal in the respective positions;
  obtaining a value of a difference between the focus error signal and a reference level;
  comparing the value of the difference between the focus error signal and the reference level with a value of a difference stored as a second reference value; and
  performing a tilt servo control operation with the size of the tilt and the direction of the tilt.

6. The method of claim 5, wherein the performing the servo control operation further comprises:
  detecting and compensating for a defocus of the respective positions using a value of the defocus offset after adjustment of the tilt, wherein the value of the defocus offset after adjustment of the tilt is a stored value.

7. A method comprising:
  detecting servo information in a plurality of determined positions of an optical recording medium, including lands and grooves of a track, in a free running state in which a focus servo of an optical device is turned on and a tracking servo of the optical device is turned off;
  storing the servo information of respective positions of the plurality of determined positions; and
  performing a servo control operation at the respective positions by applying the servo information during recording or reproducing data, wherein the detecting the servo information comprises:
  detecting a tracking error signal while varying defocus offset;
  determining to be a focus-on state, a time point at which a level of the tracking error signal corresponds to a maximum value;
  detecting a size of a tilt, and a direction of the tilt, in the focus-on state; and
  adjusting values of the tilt to be a tilt-zero and detecting the values.

8. The method of claim 7, wherein the plurality of determined positions are on one or more of inner or outer peripheries of the optical recording medium, and the detecting the servo information further comprises:
  detecting the size of the tilt from a value of a difference between center offsets of the tracking error signal in the respective positions; and
  detecting the tilt-zero by adjusting the tilt in a direction that reduces the size of the tilt.

9. The method of claim 8, wherein the direction of the tilt is detected from a sign of a value of a difference between the center offsets of the tracking error signal in the respective positions.

10. The method of claim 7, wherein the detecting the servo information further comprises:
  detecting a focus error signal in the free running state in the plurality of the determined positions;
  detecting the size of the tilt from the level of the tracking error signal;
  detecting the direction of the tilt by a value of a difference between the focus error signal and a reference level;
  detecting the tilt-zero by performing a tilt servo with the size of the tilt and the direction of the tilt; and
  detecting the level of the tracking error signal and a level of the focus error signal in response to the tilt-zero being detected.

11. The method of claim 10, wherein the detecting the direction of the tilt comprises:
  detecting an envelope of the focus error signal; and
  obtaining a value of a difference between an envelope value of the focus error signal and the reference level.

12. The method of claim 10, wherein the detecting the direction of the tilt comprises:
  holding a peak value of the focus error signal; and
  obtaining a value of a difference between the peak value of the focus error signal and the reference level.

13. The method of claim 10, wherein the detecting the tilt-zero comprises:
  determining the tilt-zero in response to the level of the tracking error signal corresponding to the maximum value, and the value of the difference between the focus error signal and the reference level being within a range.

14. The method of claim 13, wherein the reference level is a ground level.

15. The method of claim 13, wherein the reference level is a direct current (DC) level in a normal focus position, wherein the normal focus position is a position wherein there is substantially no defocus.

16. An apparatus comprising:
  means for detecting, in a free running state in which a focus servo is turned on and a tracking servo is turned off, servo information in a plurality of determined positions of a signal track, the plurality of determined positions including lands and grooves of the signal track;
  means for storing the servo information of respective positions of the plurality of determined positions; and
  means for performing a servo control operation at the respective positions by applying the servo information during recording or reproducing data, wherein the means for performing the servo control operation comprises:
  a first detecting means for:
  detecting a level of a tracking error signal in the respective positions during the recording or reproducing data; and
  detecting a focus error signal in the respective positions during the recording or reproducing data;
  a second detecting means for:
  detecting a size of a tilt by comparing the level of the tracking error signal in the respective positions with a level of the tracking error signal stored as a first reference value; and
  detecting a direction of the tilt by obtaining a value of a difference between the focus error signal and a reference level, and comparing the value of the difference between the focus error signal and the reference level with a value of a difference stored as a second reference value;
  a third detecting means for:
  receiving the size of the tilt and the direction of the tilt; and
  outputting a signal corresponding to the size of the tilt and the direction of the tilt; and means for applying the signal to perform the servo control operation, the servo control operation being a tilt servo control operation.

17. The apparatus of claim 16, wherein the means for detecting the servo information comprises:

means for detecting the tracking error signal while varying defocus offset; and means for detecting a value of defocus offset at which a level of the tracking error signal corresponds to a maximum value, the means for detecting the value of the defocus offset being configured to:

obtain a mean value of the tracking error signal; and detect the value of the defocus offset based on the mean value of the tracking error signal, the means for detecting the tracking error signal being coupled to the means for detecting the value of the defocus offset.

18. A method comprising:

detecting focus error information and tracking error information in a plurality of determined positions, including lands and grooves of a signal track of an optical recording medium, in a free running state in which a focus servo of the optical device is turned on and a tracking servo of the optical device is turned off;

storing the focus error information and the tracking error information of respective positions of the plurality of determined positions; and performing a tilt servo control operation by applying the focus error information and the tracking error information during recording or reproducing data, wherein the performing comprises detecting and compensating for a defocus in at least one of the plurality of determined positions using a stored defocus offset value after adjusting a tilt.

19. A method comprising:

detecting servo information in a plurality of determined positions of an optical recording medium, including lands and grooves of a track, in a free running state in which a focus servo of an optical device is turned on and a tracking servo of the optical device is turned off;

storing the servo information of respective positions of the plurality of determined positions; and performing a servo control operation at the respective positions by applying the servo information during recording or reproducing data, wherein the detecting the servo information comprises obtaining as reference values:

a value of a defocus offset in a focus-on state;

a level of a tracking error signal in a tilt-zero state; and a value of a difference between a level of a focus error signal and a reference level, and wherein the storing the servo information comprises storing the reference values.

* * * * *